(12) United States Patent
Cho et al.

(10) Patent No.: US 10,489,675 B2
(45) Date of Patent: Nov. 26, 2019

(54) ROBUST REGION SEGMENTATION METHOD AND SYSTEM USING THE SAME

(71) Applicant: Korea Electronics Technology Institute, Seongnam-si, Gyeonggi-do (KR)

(72) Inventors: Choong Sang Cho, Seongnam-si (KR); Hwa Seon Shin, Yongin-si (KR); Young Han Lee, Yongin-si (KR); Joo Hyung Kang, Daejeon (KR)

(73) Assignee: Korea Electronics Technology Institute, Seongnam-si, Gyeonggi-do (KR)

( * ) Notice: Subject to any disclaimer, the term of this patent is extended or adjusted under 35 U.S.C. 154(b) by 0 days.

(21) Appl. No.: 15/259,935

(22) Filed: Sep. 8, 2016

(65) Prior Publication Data
US 2017/0076462 A1    Mar. 16, 2017

(30) Foreign Application Priority Data
Sep. 15, 2015  (KR) .................. 10-2015-0130095

(51) Int. Cl.
| | |
|---|---|
| *G06K 9/00* | (2006.01) |
| *G06K 9/52* | (2006.01) |
| *G06K 9/46* | (2006.01) |
| *G06K 9/62* | (2006.01) |

(52) U.S. Cl.
CPC .................. *G06K 9/52* (2013.01); *G06K 9/46* (2013.01); *G06K 9/6215* (2013.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 8,134,596 | B2* | 3/2012 | Lei | G06K 9/00369 348/169 |
| 8,351,713 | B2* | 1/2013 | Sun | H04N 1/3876 348/584 |
| 8,467,596 | B2* | 6/2013 | Abadpour | G06T 7/73 348/135 |
| 8,532,392 | B2* | 9/2013 | Fujiwara | G06T 7/12 382/173 |
| 8,705,867 | B2* | 4/2014 | El-Maraghi | H04N 5/265 345/604 |
| 8,942,455 | B2* | 1/2015 | Chou | G06T 7/344 382/131 |
| 2013/0070995 | A1* | 3/2013 | Chou | G06T 7/344 382/131 |
| 2016/0300351 | A1* | 10/2016 | Gazit | G06T 7/11 |

* cited by examiner

*Primary Examiner* — Soo Jin Park
(74) *Attorney, Agent, or Firm* — Knobbe Martens Olson & Bear LLP

(57) ABSTRACT

Provided herein is a robust region segmentation method and a system using the same, the method including receiving setting of an image in an input image; calculating representative values for each of an internal portion and an external portion of the region; calculating a cost by substituting the representative values and a pixel value of the image in a cost function, and updating the region based on the calculated cost, wherein the cost function includes a term in which a difference between the updated pixel value and an original pixel value is reflected, thereby enabling an accurate region segmentation even in ambiguous images that are complicated and where division of regions is unclear.

3 Claims, 2 Drawing Sheets

ROBUST REGION SEGMENTATION METHOD AND SYSTEM USING THE SAME

CROSS-REFERENCE TO RELATED APPLICATIONS

This application claims priority from Korean Patent Application No. 10-2015-0130095, filed on Sep. 15, 2015, in the Korean Intellectual Property Office, the disclosure of which is incorporated herein by reference in its entirety.

BACKGROUND

Field

The present disclosure relates to a region segmentation method, and more particularly, to a method for segmenting a wanted region from an input image based on an active contour scheme, and a system using the same.

Description of the Related Art

In the case of a medical image that is complicated and where division of regions is unclear, region segmentation becomes inaccurate.

Region segmentation by the conventional method causes problems of determining even the regions outside the actual myocardium region as myocardium regions, and also determining even the tissues inside the actual myocardium region that are not part of the myocardium as myocardium regions and so on.

Thus, there is a need to develop a method that could perform an accurate region segmentation in medical images and the like that are complicated and where division of regions is ambiguous.

SUMMARY

The present disclosure is directed to solve the aforementioned problems of prior art, that is, a purpose of the present disclosure is to provide a method for performing region segmentation more accurately based on an active contour scheme, and a system using the same.

According to an embodiment of the present disclosure, there is provided an image segmentation method including receiving setting of a region in an input image; calculating representative values for each of an internal portion and an external portion of the region; calculating a cost by substituting the representative values and a pixel value of the image in a cost function, and updating the region based on the calculated cost, wherein the cost function includes a term in which a difference between the updated pixel value and an original pixel value is reflected.

Further, the calculating and the updating may be iterated while updating the pixel value.

Further, the pixel value may be updated by adding the pixel value to a multiplication of a weighted value and a kernel function value determined by the pixel value and the representative values.

Further, the pixel value may be updated using Math Equation:

$$u'_0 = u_0$$

$$u'_{t+1} = u'_t + \Delta s \times f(u'_t, c_1, c_2, \text{delta})$$

wherein $u_t'$ may be the pixel value, $u_0$ may be the original pixel value, $\Delta s$ may be the weighted value, $f(\ )$ may be the kernel function, $c_1$ may be a representative value of the internal portion of the region, $c_2$ may be a representative value of the external portion of the region, and delta may be a predetermined constant number.

Further, the $f(\ )$ may be represented as in Math Equation:

$$f(u'_t, c_1, c_2, \text{delta}) = \begin{cases} \text{sign}(c'_1 - u'_t) \times |c'_1 - u'_t|; & i \in c_1 \\ \text{sign}(c'_2 - u'_t) \times |c'_2 - u'_t|; & i \notin c_1 \end{cases}$$

$$\left. \begin{array}{l} c'_1 = c_1 \times \Delta c_d \\ c'_2 = c_2 \times \Delta c_i \end{array} \right\}, \text{ in } c_1 < c_2$$

$$\left. \begin{array}{l} c'_1 = c_1 \times \Delta c_i \\ c'_2 = c_2 \times \Delta c_d \end{array} \right\}, \text{ in } c_1 \geq c_2$$

$$\Delta c_i = (2 + \Delta c)$$

$$\Delta c_d = (2 - \Delta c)$$

wherein $\Delta c$ may be delta.

Further, the term in which a difference between the updated pixel value and an original pixel value is reflected may be expressed as a multiplication of a coefficient and the difference between the updated pixel value and the original pixel value.

According to an embodiment of the present disclosure, there is provided an image system including an inputter configured to receive setting of an region by a user in an input image; a processor configured to calculate representative values for each of an internal portion and an external portion of the region, and to calculate a cost by substituting the representative values and a pixel value of the image in a cost function, and to update the region based on the calculated cost, wherein the cost function includes a term in which a difference between the updated pixel value and an original pixel value is reflected.

Further, the processor may iterate while updating the pixel value by adding the pixel value to a multiplication of a weighted value and a kernel function value determined by the pixel value and the representative values.

As explained hereinabove, according to the embodiments of the present disclosure, it is possible to perform region segmentation accurately even in a complicated image where division of regions is ambiguous. Further, according to embodiments of the present disclosure, it is possible to lay the foundation to enable an accurate segmentation of wanted objects from not only medical images but also from other types of images.

BRIEF DESCRIPTION OF THE DRAWING FIGURES

The above and/or other aspects of the present invention will be more apparent by describing certain embodiments of the present disclosure with reference to the accompanying drawings.

DETAILED DESCRIPTION

Hereinafter, various embodiments of the present disclosure will be described in detail with reference to the accompanying drawings.

Figure 1:
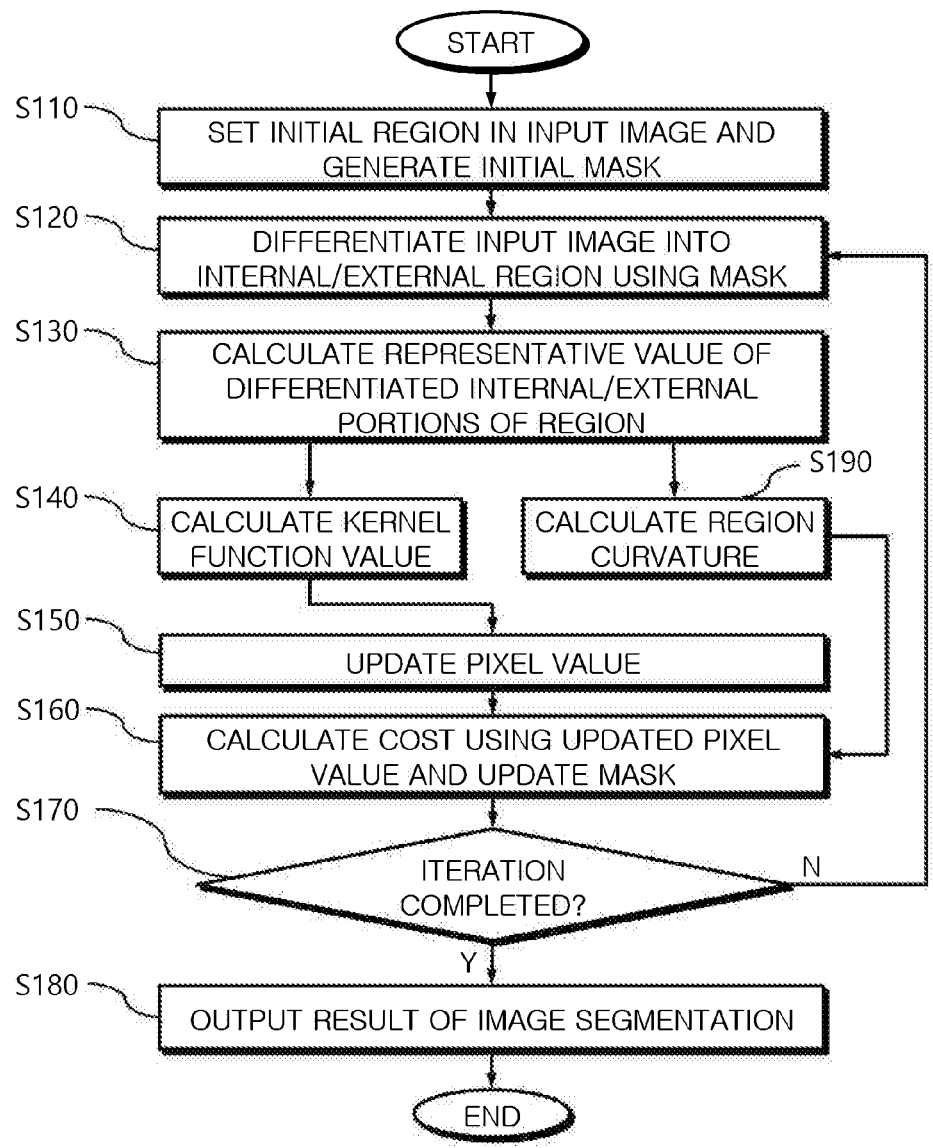
FIG. 1 is a flowchart provided to explain a region segmentation method according to an embodiment of the present disclosure.

FIG. 1 is a flowchart provided to explain the region segmentation method according to an embodiment of the present disclosure. The region segmentation method according to an embodiment of the present disclosure automatically separates an input image into an internal region and an external region based on an initial image input by the user, in order to separate a region wanted by the user from the input image.

For this purpose, as illustrated in FIG. 1, first of all, from the input image, the initial region is determined by the user, and an initial mask is created where the region is differentiated according to the determined result (S110).

Next, based on the initial mask (an updated mask in the subsequent iterating processes), the input image is differentiated into an internal region and an external region (S120).

Then, representative values are created respectively for the internal region and the external region of the differentiated region, and then in the subsequent iterating processes, the representative values are adaptively updated (S130). Further, using a pixel value and the representative values, a kernel function value to be used in updating the pixel value is calculated (S140).

Further, based on the kernel function value calculated at step S140, the pixel value is adaptively updated (S150). Next, the pixel value updated at step S150 is substituted in a cost function to calculate a cost, and the mask is updated based on the calculated cost (S160).

Meanwhile, in the mask updating at step S160, a curvature of the region that will be calculated at step S190 is used.

Then, steps S120 to S160 are iterated while updating the pixel value until certain conditions are satisfied (S170). When the iterating is completed (S170-Y), an image segmentation result is output (S180).

The cost function used at step S160 includes an adaptive mismatch analysis term for its stable and high performance. The adaptive mismatch analysis term is a term in which a difference between the updated pixel value and the original pixel value is reflected.

The cost function F( ) used at step S160 is represented as in Math Equation 1 shown below.

$$\frac{\partial F}{\partial \phi} = \mu \int_\Omega \delta_\varepsilon(\phi(x,y)) div\left(\frac{\nabla \phi(x,y)}{|\nabla \phi(x,y)|}\right) dxdy +$$

$$v \int_\Omega \delta_\varepsilon(\phi(x,y)) dxdy +$$

$$\lambda_1 \int_\Omega |u'_t(x,y) - c_1|^2 \delta_\varepsilon(\phi(x,y)) dxdy + \lambda_2$$

$$\int_\Omega |u'_t(x,y) - c_2|^2 \times -\delta_\varepsilon(\phi(x,y)) dxdy + \lambda(u'_t - u_0)$$

[Math Equation 1]

Here, $u_t'$ is the pixel value, $u_0$ is the original pixel value, $c_1$ is the representative value of the internal portion of the region, $c_2$ is the representative value of the external portion of the region, and $\lambda$ is a value set by the user or set beforehand. Further, $\lambda(u_t'-u_0)$, the final term in Math Equation 1 above, is the adaptive mismatch analysis term.

Meanwhile, the representative values $c_1$, $c_2$ of the internal portion/external portion of the region to be generated at step S120 are calculated using Math Equation 2 and Math Equation 3 below. Math Equation 2 is a math equation configured to calculate the representative value $c_1$ of the internal portion of the region, and Math Equation 3 is a math equation configured to calculate the representative value $c_2$ of the external portion of the region.

$$\frac{\partial F}{\partial c_1} =$$

$$\lambda_1 \int_\Omega -2 \times (u'_t(x,y) - c_1) \times H_\varepsilon(\phi(x,y)) dxdy = 0$$

$$c_1 = \frac{\int_\Omega (u'_t(x,y)) \times H_\varepsilon(\phi(x,y)) dxdy}{\int_\Omega H_\varepsilon(\phi(x,y)) dxdy}$$

[Math Equation 2]

$$\frac{\partial F}{\partial c_2} =$$

$$\lambda_2 \int_\Omega -2 \times (u'_t(x,y) - c_2) \times (1 - H_\varepsilon(\phi(x,y))) dxdy = 0$$

$$c_2 = \frac{\int_\Omega (u'(x,y)) \times (1 - H_\varepsilon(\phi(x,y))) dxdy}{\int_\Omega (1 - H_\varepsilon(\phi(x,y))) dxdy}$$

[Math Equation 3]

Further, the updating of pixel value at step S150 is performed through Math Equation 4 below.

$$u'_0 = u_0$$

$$u'_{t+1} = u'_t + \Delta s \times f(u'_t, c_1, c_2, \text{delta})$$

[Math Equation 4]

Here, $u_t'$ is the current pixel value, $u_{t+1}'$ is the updated pixel value, $u_0$ is the original pixel value, $\Delta s$ is the weighted value, $f( )$ is the kernel function, and delta is the value set by the user or set beforehand. As can be seen from Math Equation 4, the updated pixel value equals the multiplication of the weighted value and the kernel function value determined by the pixel value and the representative values plus the pixel value.

The kernel function $f( )$ used in updating the pixel value is represented as in Math Equation 5 shown below.

$$f(u'_t, c_1, c_2, \text{delta}) = \begin{cases} \text{sign}(c'_1 - u'_t) \times |c'_1 - u'|; & i \in c_1 \\ \text{sign}(c'_2 - u'_t) \times |c'_2 - u'|; & i \notin c_1 \end{cases}$$

[Math Equation 5]

Here, $c_1'$ and $c_2'$ are updated values of $c_1$ and $c_2$, respectively. $c_1'$ and $c_2'$ are calculated through Math Equation 6 shown below.

$$\left. \begin{array}{l} c'_1 = c_1 \times \Delta c_d \\ c'_2 = c_2 \times \Delta c_i \end{array} \right\}, \text{in } c_1 < c_2$$

$$\left. \begin{array}{l} c'_1 = c_1 \times \Delta c_i \\ c'_2 = c_2 \times \Delta c_d \end{array} \right\}, \text{in } c_1 \geq c_2$$

$$\Delta c_i = (2 + \Delta c)$$

$$\Delta c_d = (2 - \Delta c)$$

[Math Equation 6]

Here, $\Delta c$ the delta.

Figure 2:
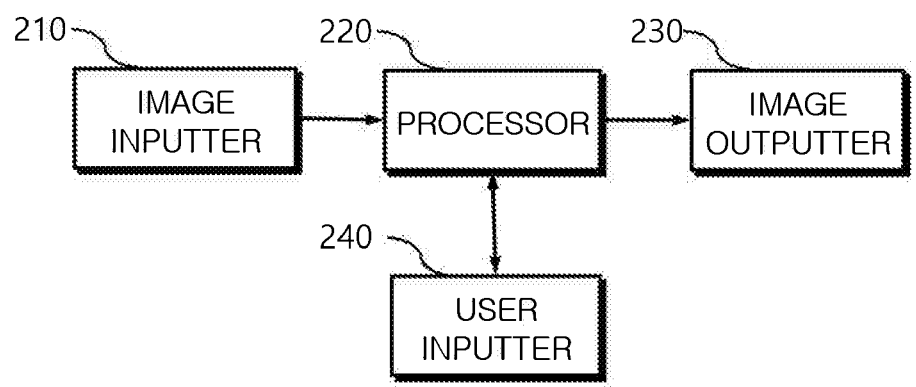
FIG. 2 illustrates a block diagram of an image system capable of performing the region segmentation method according to another embodiment of the present disclosure.

FIG. 2 illustrates a block diagram of an image system capable of performing the region segmentation method illustrated in FIG. 1. As illustrated in FIG. 2, the image system includes an image inputter 210, a processor 220, an image outputter 230 and a user inputter 240.

The image inputter 210 provides an original image to the processor 220. The image inputter 210 is a communication interface for receiving the original image from a storage medium, an external device, or a network where the original image is stored.

The processor 220 performs the algorithm presented in FIG. 1 in order to separate a region from the original image input from the image inputter 210, and receives setting of the initial region by the user through the user inputter 240. The processor 240 includes a graphic processing unit (GPU) and a central processing unit (CPU).

The image outputter 230 is a means for outputting the region segmented image being output from the processor 220 through a display, or for transmitting the same to an external apparatus or a network.

Hereinabove, preferable embodiments of the region segmentation method and the image system for performing the same were explained in detail.

The embodiments of the present disclosure may be applied to not only medical image analyzing but also extracting/tracking an object of interest, and producing contents, etc.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image segmentation method comprising:
   (a) setting a region in an image based on an input;
   (b) creating a mask corresponding to the region;
   (c) segmenting the image using the mask into an internal region and an external region;
   (d) calculating a first representative value for the internal region and a second representative value for the external region;
   (e) computing a kernel function value for updating a pixel value of the image using the first representative value, the second representative value and the pixel value;
   (f) updating the pixel value using the kernel function value;
   (g) subsequent to updating the pixel value, computing a cost value by applying the first representative value, the second representative value and the pixel value to a cost function; and
   (h) updating the mask for segmenting the image in view of the cost value,
   wherein the pixel value is updated using the kernel function value, and
   wherein the kernel function value is computed based on the following kernel function:

$f(u'_t, c_1, c_2, \text{delta})$ where $u_t'$ is the pixel value, $c_1$ is the first representative value for the internal region, $c_2$ is the second representative value for the external region, and delta is a value set by a user or set beforehand.

2. The image segmentation method of claim 1, wherein the f( ) satisfies the following mathematical equation:

$$f(u'_t, c_1, c_2, \text{delta}) = \begin{cases} \text{sign}(c'_1 - u'_t) \times |c'_1 - u'|; & i \in c_1 \\ \text{sign}(c'_2 - u'_t) \times |c'_2 - u'|; & i \notin c_1 \end{cases}$$

$$\left.\begin{array}{l} c'_1 = c_1 \times \Delta c_d \\ c'_2 = c_2 \times \Delta c_i \end{array}\right\}, \text{ in } c_1 < c_2$$

$$\left.\begin{array}{l} c'_1 = c_1 \times \Delta c_i \\ c'_2 = c_2 \times \Delta c_d \end{array}\right\}, \text{ in } c_1 \geq c_2$$

$$\Delta c_i = (2 + \Delta c)$$

$$\Delta c_d = (2 - \Delta c)$$

wherein $\Delta c$ is delta.

3. An image processing system comprising:
   an inputter configured to receive an input for setting a region in an image; and
   a processor configured to:
   (a) set region in an image based on the input;
   (b) create a mask corresponding to the region;
   (c) segment the image using the mask into an internal region and an external region;
   (d) calculate a first representative value for the internal region and a second representative value for the external region;
   (e) compute a kernel function value for updating a pixel value of the image using the first representative value, the second representative value and the pixel value;
   (f) update the pixel value using the kernel function value;
   (g) subsequent to updating the pixel value, compute a cost value by applying the first representative value, the second representative value and the pixel value to a cost function; and
   (h) update the mask for segmenting the image in view of the cost value,
   wherein the pixel value is updated using the kernel function value, and
   wherein the kernel function value is computed based on the following kernel function:

$f(u'_t, c_1, c_2, \text{delta})$ where $u_t'$ is the pixel value, $c_1$ is the first representative value for the internal portion of the region, $c_2$ is the second representative value for the external region, and delta is a value set by a user or set beforehand.

* * * * *